(12) United States Patent
Schmid et al.

(10) Patent No.: US 6,407,362 B1
(45) Date of Patent: Jun. 18, 2002

(54) PROTECTIVE DEVICE FOR PRODUCING VERY SMALL BORES IN TUBULAR COMPONENTS, AND METHOD FOR PRODUCING BORES

(75) Inventors: Gerhard Schmid, Nürtingen; Hartmut Gross, Lengenfeld, both of (DE)

(73) Assignee: Hydraulik-Ring GmbH, Limbach-Oberfrohna (DE)

( * ) Notice: Subject to any disclaimer, the term of this patent is extended or adjusted under 35 U.S.C. 154(b) by 0 days.

(21) Appl. No.: 09/359,993

(22) Filed: Jul. 22, 1999

(30) Foreign Application Priority Data

Jul. 22, 1998 (DE) .......................... 198 32 774

(51) Int. Cl.⁷ .................. B23K 26/38; B23K 26/40; B23K 26/18
(52) U.S. Cl. .................. 219/121.71; 219/121.7
(58) Field of Search .......... 219/121.7, 121.71, 219/121.6

(56) References Cited

U.S. PATENT DOCUMENTS 4,894,509 A * 1/1990 Chalco et al. ........... 219/121.6
5,514,867 A * 5/1996 Beyer et al. ............. 219/121.6

FOREIGN PATENT DOCUMENTS

| GB | 2236070 | * | 3/1991 | ............ 219/121.71 |
| JP | 61-169188 | * | 7/1986 | |

* cited by examiner

Primary Examiner—Geoffrey S. Evans
(74) Attorney, Agent, or Firm—Gudrun E. Huckett

(57) ABSTRACT

A protective device and method for producing bores, especially very small bores, that open out into a hollow space in a tubular component are provided. The protective device is embodied as a hollow body that is at least partially energy reducing for laser beams. Pursuant to the method, the wall of the component is perforated with a laser beam to produce the bore. After perforation of the wall, the energy of the laser beam is reduced within the hollow space of the component to such an extent that the laser beam does not damage the wall of the hollow space that is disposed across from the produced bore.

19 Claims, 1 Drawing Sheet

PROTECTIVE DEVICE FOR PRODUCING VERY SMALL BORES IN TUBULAR COMPONENTS, AND METHOD FOR PRODUCING BORES

BACKGROUND OF THE INVENTION

The present invention relates to a protective device for producing very small bores in tubular components, especially in fuel injection nozzles for internal combustion engines. The present invention also relates to a method of producing such bores, especially very small bores, that open out into a hollow space in tubular workpieces, especially in fuel injection nozzles for internal combustion engines.

In the past, microbores were produced by a cutting or electrical discharge type of machining. Such methods are time consuming, tool intensive and in addition relatively imprecise. Finally, with such methods it is only possible to produce having bores circular diameters in workpieces. Furthermore, after the bores are produced their walls are relatively rough.

It is therefore an object of the present invention to be able to economically and precisely produce very small bores.

SUMMARY OF THE INVENTION

The protective device of the present invention is characterized primarily in that it is embodied as a hollow body that is at least partially energy reducing for laser beams. The method of producing a bore pursuant to the present invention is characterized primarily in that the wall of the workpiece is perforated by a laser beam for producing the bore, and in that after the laser beam has perforated the wall the energy of the laser beam within the hollow space of the workpiece is reduced to such an extent that the laser beam does not damage the wall of the hollow space that is disposed across form the produced bore.

As a consequence of the inventive configuration of the protective device as well as of the inventive method, the energy of the laser beam that exits the wall of the workpiece after the production of the microbore is so significantly reduced that the laser beam does not lead to damage of the workpiece or of the protective device. Very precise microbores having very smooth walls can be produced with the laser beam. The service life of the protective device can advantageously be extended by supplying it with compressed air and/or subjecting the device to a vacuum in order to cool the protective device.

Further specific features of the present invention will be described in detail subsequently.

BRIEF DESCRIPTION OF THE DRAWING

This object, and other objects and advantages of the present invention, will appear more clearly from following specification in conjunction with the accompanying schematic drawing, in which.

DESCRIPTION OF PREFERRED EMBODIMENTS

Figure 1:
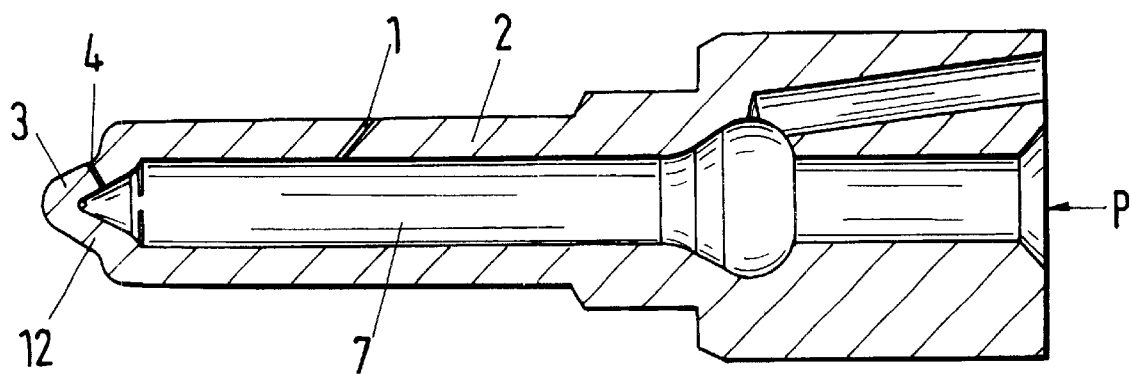
FIG. 1 is an axial cross-sectional view through a fuel injection nozzle for internal combustion engines.

Referring now to the drawing in detail, the injection nozzle 1 illustrated in FIG. 1 serves for the injection of fuel into internal combustion engines. The injection nozzle 1 is provided in a known manner with a tapered, cylindrical nozzle body 2, which, for example, has a diameter of about 4 mm and at its free end merges into an injection cone 3. The nozzle body 2 serves for the pre and main injection of the fuel. A plurality of injections bores 4 are provided in the injection cone 3; these injection bores can be disposed symmetrically as well as asymmetrically. The injection bores 4 are microbores having a diameter of about 0.10 to 0.18 mm, and must be machined very precisely. For this purpose, high energy, highly pulsed special lasers are used. To produce the injection bores 4, the wall 12 of the injection cone 3 is perforated with a laser beam 11. The energy of the laser beam 11 is so great that it perforates the wall 12 accompanied by the formation of the microbore 4. After the laser beam 12 has passed the wall 12 it still has sufficient energy that it would damage the oppositely disposed region of the inner wall 5. To avoid such damage by the laser beam 11, a protective device 8 (FIG. 2) is introduced into the bore 7 of the nozzle body 2; the protective device 8 extends to the base of the injection cone 3, and is preferably made of metallic material, such as copper or molybdenum.

The protective device is embodied as a tube that terminates in a conical tip 9. The protective device has an opening 10 through which the laser beam 11 passes after perforating the wall 12 of the injection cone 3. The protective device is preferably made of high strength glass. In addition, the conical tip 9 is preferably fused to the tubular body 13 of the protective device 8. As a consequence, a satisfactory connection is ensured between the conical tip 9 and the tubular body 13.

Figure 2:
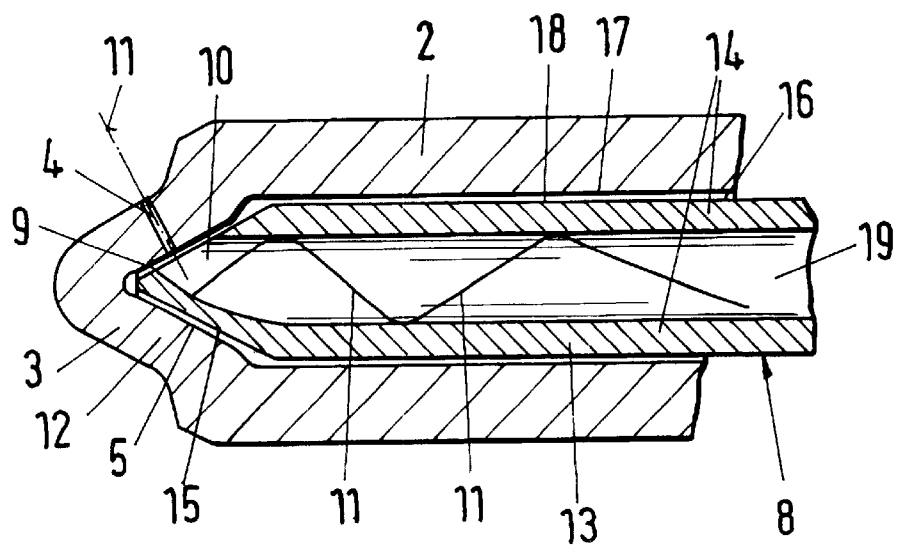
FIG. 2 is an enlarged view of the nozzle end of the fuel injection nozzle of FIG. 1 together with one exemplary embodiment of an inventive protective device that is disposed in the nozzle during the production of bores in the injection nozzle.

That region 15 of the protective device 8 that is disposed across from the opening 10 is provided with a reflective layer 14 at which the laser beam 11 that enters through the opening 10 is reflected. The reflective layer 14 advantageously extends over the entire inner wall of the tubular body 13 as well as of the conical tip 9 so that the inner wall of the protective device 8 is completely covered with the reflective material. The reflective layer 14 preferably comprises a gold or silver layer that is advantageously vapor deposited on the inner wall of the conical tip 9 and of the tubular body 13. Other materials can also be used for the reflective layer 14, including, by way of example only, a copper layer or coating, or a molybdenum layer or coating, which are appropriately polished. The reflective layer 14 reflects the laser beam 11 in the manner illustrated in FIG. 2, so that the laser beam loses energy and hence effectiveness. As shown in FIG. 2, after the laser beam 11 has entered the protective device 8 it is reflected back and forth by the reflective layer 14 and in this manner is guided out of the protective device and has its energy reduced.

The annular space 16 formed between the inner wall 17 of the nozzle body 2 and the outer wall 18 of the protective device 8 is preferably supplied with compressed air. In this way, overheating of the protective device 8 by the laser beam 11 is avoided. The inner chamber of the protective device 8 can be connected to a vacuum source as a function of length and cross-sectional area, which in conjunction with the expansion of the compressed air in the annular space 16 leads to a cooling effect in the region of the opening 10 of the protective device 8. In addition, the connection of the protective device 8 with the vacuum source has the advantage that metal vapors and molten particles that result during the production of the injection bores are drawn off in a simple manner via the bore 19. The period of use of the protective device 8 can be considerably increased by means of the described induced cooling via the vacuum.

As mentioned previously, the protective device can also be made of a material other than glass, for example of the same material as the reflective layer. In every case, however, the material must have reflective properties. For example, the protective device 8 can be made of solid polished copper of molybdenum.

Prior to the production of the injection bores 4, the described protective device 8 is introduced into the injection nozzle 1 in the direction of the arrow P (See FIG. 1) until the conical tip 9 of the protective device rests against the base of the blind bore 7 of the injection nozzle 1. Thereafter, the protective device 8 is rotated in such a way that its opening 10 is disposed below the injection bore 4 that is to be bored. Subsequently, the microbore 4 is produced in the injection cone 3 of the injection nozzle I via the laser beam 11. After perforating the wall 12, the laser beam 11 passes through the opening 10 into the protective device 8 where, as described previously, it is reflected on the reflective layer 14, as a consequence of which it loses energy and effectiveness. At the same time, the annular space 16 is supplied with compressed air in order to cool the protective device 8. Furthermore, the inner chamber or bore 19 of the protective device 8 is subjected to a vacuum in order to reinforce the cooling of the compressed air and also to remove dirt particles, such as metal vapor and molten particles, that have entered the protective device.

By using the inventive protective device 8 in the manner described, it is possible to reliably and economically provide tube-type components, such as injection nozzles, with bores having diameters in the micro range. The described protective device enables an industrial utilization of laser boring for injection nozzles or similar components.

The specification incorporates by reference the disclosure of German priority document 198 32 774.9 of Jul. 22 1998.

The present invention is, of course, in no way restricted to the specific disclosure of the specification and drawing, but also encompasses any modifications within the scope of the appended claims.

What is claimed is:

1. A protective device for producing very small bores in tubular components, comprising:
    a hollow body; and
    means provided in said hollow body for at least partially reducing the energy of a laser beam, wherein said device is made of fracture-resistance glass.

2. A protective device according to claim 1, wherein said energy-reducing means are means for at least partially reflecting a laser beam.

3. A protective device according to claim 2, wherein a reflective layer is provided on an inner wall of said protective device for reflecting said laser beam.

4. A protective device for producing very small bores in tubular components, comprising:
    a hollow body comprising a tubular body, an end region of which is a conical tip; and
    means provided in said hollow body for at least partially reducing the energy of a laser beam.

5. A protective device according to claim 4, wherein an end of said tubular body remote from said end portion thereof is connectable to a vacuum device.

6. A protective device according to claim 4, wherein said end region is fused onto said tubular body.

7. A protective device according to claim 4, wherein said end region of said tubular body is provided with at least one inlet opening for said laser beam.

8. A protective device according to claim 7, wherein said energy-reducing means is a reflective layer provided on at least a portion of an inner wall of said tubular body that is disposed across from said at least one inlet opening.

9. A protective device according to claim 8, wherein said reflective layer extends over the entire inner wall of said tubular body.

10. A protective device according to claim 8, wherein said reflective layer is vapor deposited on said inner wall of said protective device.

11. A protective device according to claim 8, wherein said reflective layer is a silver, gold, copper or molybdenum coating.

12. A protective device according to claim 4, wherein said device is made of a metallic material selected from the group consisting of copper or molybdenum.

13. A protective device according to claim 12, wherein an inner wall of said tubular body is polished.

14. A method of producing a bore that opens out into a hollow space in a tubular workpiece, including the steps of:
    introducing a protective device into said hollow space of said workpiece;
    perforating a wall of said workpiece with a laser beam to produce said bore;
    reflecting said laser beam on said protective device; and
    reducing the energy of said laser beam within said hollow space of said workpiece, after said laser beam has perforated said wall, to such an extent that said laser beam does not damage that wall of said hollow space of said workpiece that is disposed across from the produced bore, wherein an inner chamber of said protective device is subjected to a vacuum.

15. A method according to claim 14, wherein said reflecting step comprises a multiple reflection of said laser on said protective device out of a working region.

16. A method according to claim 14, which includes the further steps of providing an annular space between an inner wall of said hollow space of said workpiece and an outer wall of said protective device, and supplying compressed air to said annular space.

17. A method of producing a bore that opens out into a hollow space in a tubular workpiece, including the steps of:
    introducing a protective device into said hollow space of said workpiece;
    perforating a wall of said workpiece with a laser beam to produce said bore;
    introducing the laser beam through an opening into a hollow chamber of said protective device; and
    reflecting said laser beam at that location in such a way that said laser beam loses energy.

18. A method according to claim 17, wherein said reflecting step comprises a multiple reflection of said laser on said protective device out of a working region.

19. A method according to claim 17, which includes the further steps of providing an annular space between an inner wall of said hollow space of said workpiece and an outer wall of said protective device, and supplying compressed air to said annular space.

* * * * *